United States Patent
Iwamura

(10) Patent No.: US 12,503,131 B2
(45) Date of Patent: Dec. 23, 2025

(54) DRIVING ASSISTANCE DEVICE AND DRIVING ASSISTANCE METHOD

(71) Applicant: Panasonic Intellectual Property Management Co., Ltd., Osaka (JP)

(72) Inventor: Hiroshi Iwamura, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 61 days.

(21) Appl. No.: 18/420,400

(22) Filed: Jan. 23, 2024

(65) Prior Publication Data
US 2024/0253654 A1    Aug. 1, 2024

(30) Foreign Application Priority Data
Jan. 26, 2023 (JP) .................. 2023-010326

(51) Int. Cl.
G08B 21/00 (2006.01)
B60W 40/09 (2012.01)
(Continued)

(52) U.S. Cl.
CPC ............ B60W 50/14 (2013.01); B60W 40/09 (2013.01); G06V 20/597 (2022.01); G06V 40/18 (2022.01);
(Continued)

(58) Field of Classification Search
CPC .............. G01C 21/365; G01C 21/3632; G01C 21/3635; G01C 21/3638; G01C 1/00;
(Continued)

(56) References Cited

U.S. PATENT DOCUMENTS

2011/0161380 A1*  6/2011  Keaveny ................ G06Q 10/06
                                                            707/812
2017/0192428 A1*  7/2017  Vogt ..................... G01C 21/3461
(Continued)

FOREIGN PATENT DOCUMENTS

JP    2020-071537    5/2020

OTHER PUBLICATIONS

Office Action from Japan Patent Office (JPO) in Japanese Patent Appl. No. 2023-010326, dated Dec. 3, 2024, together with an English language translation.

*Primary Examiner* — Daniel Previl
(74) *Attorney, Agent, or Firm* — Greenblum & Bernstein, P.L.C.

(57) ABSTRACT

A driving assistance device includes: a sight line detector that detects a sight line of a first user driving a first vehicle; a feature detector that detects a feature in a vicinity of the first vehicle; a visual recognition determiner that determines whether the first user visually recognized the feature, based on the sight line detected and the feature detected; a position detector that detects a first position of the first vehicle; an obtainer that obtains a second position that a second vehicle was at when a second user driving the second vehicle visually recognized the feature in past; and an alerter that performs, at a timing determined based on a result of comparison between the first position and the second position, alerting to prompt the first user to visually recognize the feature, when the visual recognition determiner determines that the first user has not visually recognized the feature.

11 Claims, 10 Drawing Sheets

(51) Int. Cl.
- *B60W 50/14* (2020.01)
- *G06V 20/59* (2022.01)
- *G06V 40/18* (2022.01)
- *B60W 50/00* (2006.01)

(52) U.S. Cl.
CPC .............. *B60W 2050/0083* (2013.01); *B60W 2420/403* (2013.01); *B60W 2520/12* (2013.01); *B60W 2540/225* (2020.02); *B60W 2554/4041* (2020.02); *B60W 2554/80* (2020.02); *B60W 2556/10* (2020.02)

(58) Field of Classification Search
CPC ... G01C 3/00; G01C 5/00; G01C 7/00; G01C 9/00; G01C 11/00; G01C 13/00; G01C 15/00; G01C 17/00; G01C 19/00; G01C 21/00; G01C 22/00; G01C 23/00; G01C 25/00; B60K 2360/166; B60K 35/10; B60K 35/23; B60K 35/28; B60K 2360/785; B60K 35/22; B60K 35/60; B60K 1/00; B60K 3/00; B60K 5/00; B60K 6/00; B60K 7/00; B60K 8/00; B60K 11/00; B60K 13/00; B60K 15/00; B60K 16/00; B60K 17/00; B60K 20/00; B60K 23/00; B60K 25/00; B60K 26/00; B60K 28/00; B60K 31/00; B60K 35/00; B60K 37/00; B60K 2310/00; B60K 2360/00; B60K 2700/00; B60K 2702/00; B60K 2704/00; B60R 1/001; B60R 1/24; B60R 11/02; B60R 2300/205; B60R 2300/308; B60R 3/00; B60R 1/00; B60R 7/00; B60R 5/00; B60R 9/00; B60R 11/00; B60R 13/00; B60R 15/00; B60R 16/00; B60R 17/00; B60R 19/00; B60R 21/00; B60R 22/00; B60R 25/00; B60R 99/00; G06F 18/214; G06F 3/013; G06F 3/1423; B60W 40/08; B60W 2050/0083; B60W 2050/143; B60W 2420/403; B60W 2520/12; B60W 2540/225; B60W 2554/4041; B60W 2554/80; B60W 2556/10; B60W 40/09; B60W 50/14; G06N 20/00; G06N 3/08; G06N 3/09; G06V 20/20; G06V 20/58; G06V 20/584; G06V 20/597; G06V 20/582; G06V 20/588; G06V 40/18; G08G 1/00; G08G 1/09; G08G 1/16; G09B 29/007; G09B 29/10; H04N 5/74; H04N 7/18; H04N 23/56; H04N 7/183; H04N 9/3194; B60Q 1/04; B60Q 1/545; B60Q 1/547; B60Q 2400/50; B60Q 9/00; G02B 2027/0138; G02B 2027/014; G02B 27/0101; G09G 2360/04; G09G 2380/10; G09G 3/001; G09G 5/36; G09G 5/40; G09G 1/00; G09G 3/00; G09G 5/00; G09G 2230/00; G09G 2290/00; G09G 2300/00; G09G 2310/00; G09G 2320/00; G09G 2330/00; G09G 2340/00; G09G 2350/00; G09G 2352/00; G09G 2354/00; G09G 2356/00; G09G 2358/00; G09G 2360/00; G09G 2370/00; G09G 2380/00

USPC ...... 340/425.5, 427, 426.12, 426.22, 426.29, 340/438, 435, 464, 488, 507, 516–517, 340/525, 539.13, 539.22, 568.1

See application file for complete search history.

(56) References Cited

U.S. PATENT DOCUMENTS

| | | | |
|---|---|---|---|
| 2017/0364070 A1* | 12/2017 | Oba | B60W 50/08 |
| 2020/0130578 A1* | 4/2020 | Murakami | B60K 35/00 |
| 2020/0284883 A1* | 9/2020 | Ferreira | G01S 7/4815 |
| 2021/0129864 A1* | 5/2021 | Wang | H04W 4/40 |
| 2022/0277570 A1* | 9/2022 | Takamoto | G06V 10/40 |

* cited by examiner

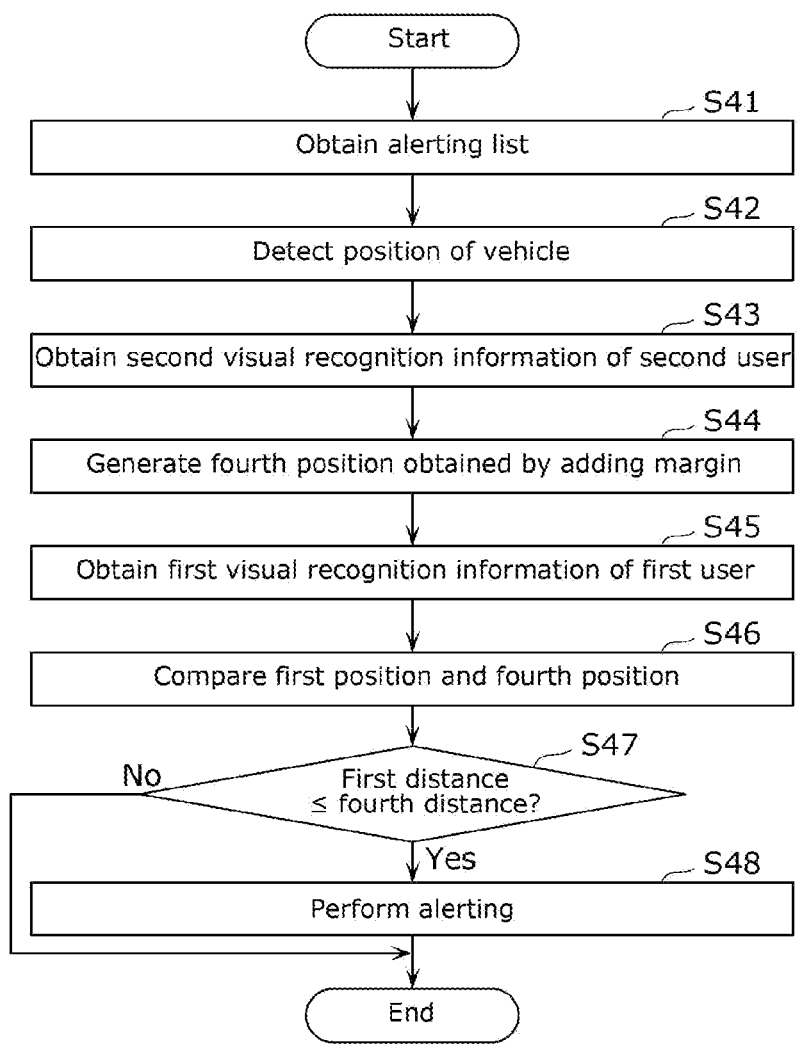

DRIVING ASSISTANCE DEVICE AND DRIVING ASSISTANCE METHOD

CROSS REFERENCE TO RELATED APPLICATION

The present application is based on and claims priority of Japanese Patent Application No. 2023-010326 filed on Jan. 26, 2023.

FIELD

The present disclosure relates to a driving assistance device and a driving assistance method.

BACKGROUND

Patent Literature (PTL) 1 discloses a driving assistance device that compares a driver's sight line distribution and a sight line distribution in a database, and determines from the comparison result whether the driver's sight line is directed toward a target that should be visually recognized in the vicinity of the driver's vehicle.

CITATION LIST

Patent Literature

PTL 1: Japanese Unexamined Patent Application Publication No. 2020-71537

SUMMARY

However, the driving assistance device in PTL 1 can be improved upon.

In view of this, the present disclosure provides a driving assistance device, and so on, that is capable of improving upon the related art.

A driving assistance device according to an aspect of the present disclosure includes: a processor; and a non-transitory memory in which a program is stored, wherein the processor executes the program to cause the driving assistance device to operate as: a sight line detector that detects a sight line of a first user who is driving a first vehicle; a feature detector that detects a feature in a vicinity of the first vehicle; a visual recognition determiner that determines whether the first user visually recognized the feature, based on the sight line detected and the feature detected; a position detector that detects a first position of the first vehicle; an obtainer that obtains a second position that a second vehicle was at when a second user driving the second vehicle visually recognized the feature in past; and an alerter that performs alerting to prompt the first user to visually recognize the feature, when the visual recognition determiner determines that the first user has not visually recognized the feature, the alerting being performed at a timing that is determined based on a result of comparison between the first position and the second position.

A driving assistance method according to an aspect of the present disclosure is a driving assistance method executed by a processor by executing a program stored in a memory, the driving assistance method including: detecting a sight line of a first user who is driving a first vehicle; detecting a feature in a vicinity of the first vehicle; determining whether the first user visually recognized the feature, based on the sight line detected and the feature detected; detecting a first position of the first vehicle; obtaining a second position that a second vehicle was at when a second user driving the second vehicle visually recognized the feature in past; and performing alerting to prompt the first user to visually recognize the feature, when it is determined that the first user has not visually recognized the feature, the alerting being performed at a timing that is determined based on a result of comparison between the first position and the second position.

It should be noted that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

A driving assistance device, and so on, according to an aspect of the present disclosure is capable of improving upon the related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 11 is a flowchart illustrating an example of an alerting process in Embodiment 2.

DESCRIPTION OF EMBODIMENTS

Figure 1:
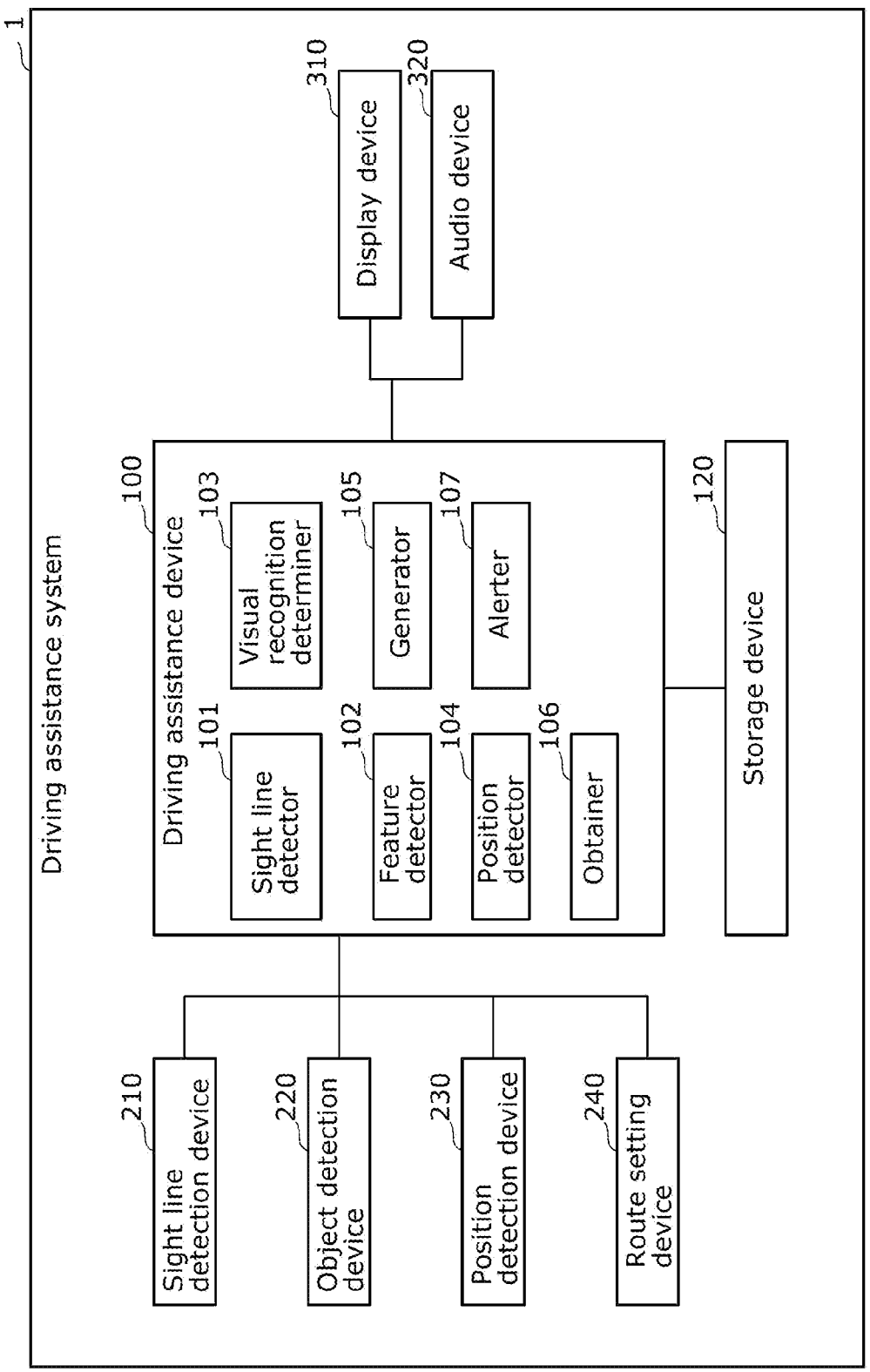
FIG. 1 is a block diagram illustrating a configuration of a driving assistance system including a driving assistance device according to Embodiment 1.

Underlying Knowledge Forming Basis of the Present Disclosure

With the driving assistance device in PTL 1, driver proficiency-based alerting is performed based on driving proficiency calculated from a sight line distribution result.

However, in the above related art, performing alerting at an appropriate timing is not taken into consideration. For this reason, even when the driver is alerted, the vehicle may have traveled past a target to be visually recognized, and there is the risk that the driver will overlook the target to be visually recognized in the vicinity of the vehicle.

After diligent studies, the inventor has conceived of a driving assistance vehicle that is capable of performing alerting at an appropriate timing.

A driving assistance device according to a first aspect of the present invention includes: a processor; and a non-transitory memory in which a program is stored, wherein the processor executes the program to cause the driving assistance device to operate as: a sight line detector that detects a sight line of a first user who is driving a first vehicle; a feature detector that detects a feature in a vicinity of the first vehicle; a visual recognition determiner that determines whether the first user visually recognized the feature, based on the sight line detected and the feature detected; a position detector that detects a first position of the first vehicle; an obtainer that obtains a second position that a second vehicle was at when a second user driving the second vehicle visually recognized the feature in past; and an alerter that performs alerting to prompt the first user to visually recognize the feature, when the visual recognition determiner determines that the first user has not visually recognized the feature, the alerting being performed at a timing that is determined based on a result of comparison between the first position and the second position.

Accordingly, alerting that prompts the first user to visually recognize the feature is performed at a timing that is determined based on a result of comparison between a first position that the first vehicle is at when it is determined that the user has not visually recognized the feature and a second position that a second vehicle was at when a second user driving the second vehicle visually recognized the feature in the past. In other words, since alerting can be performed at a timing in which the first user can visually recognize the feature, based on the position of the first vehicle, the possibility that the first driver will overlook the feature can be reduced.

A driving assistance device according to a second aspect of the present disclosure is the driving assistance device according to the first aspect of the disclosure, wherein when the visual recognition determiner determines that the first user has not visually recognized the feature, the alerter performs the alerting at a timing when the first position detected reaches a range from the second position to the feature, inclusive.

Accordingly, since alerting of the first user is performed at least at the timing at which the second user visually recognized the feature in the past, the possibility that the first driver will overlook the feature can be reduced.

A driving assistance device according to a third aspect of the present disclosure is the driving assistance device according to the first aspect of the disclosure, wherein the obtainer further obtains a third position that the first vehicle was at when the first user visually recognized the feature in the past, and when the visual recognition determiner determines that the first user has not visually recognized the feature and the third position is located closer to the feature than the second position is, the alerter performs the alerting at a timing when the first position reaches a range from a fourth position to the feature, inclusive, the fourth position being farther from the feature than the second position is.

Accordingly, since alerting of the first user is performed at least at a timing that is earlier than the timing at which the second user visually recognized the feature in the past, the possibility that the first driver will overlook the feature can be reduced.

A driving assistance device according to a fourth aspect of the present disclosure is the driving assistance device according to any one of the first to third aspects of the disclosure, wherein the processor further causes the driving assistance device to operate as: a storage in which alerting setting information is stored on a per feature basis, the alerting setting information indicating a setting as to whether alerting is to be performed; and an updater that updates the alerting setting information of a feature that was visually recognized in the past by the first user at the third position located farther from the feature than the second position is, to a setting indicating that the alerting is not to be performed. Here, the alerter performs the alerting for a first feature and does not perform the alerting for the second feature, the setting in the alerting setting information corresponding to the first feature indicating that the alerting is to be performed, the setting in the alerting setting information corresponding to the second feature indicating that the alerting is not to be performed.

Accordingly, since a feature that the first user visually recognized in the past at an earlier timing than the second user did can be determined as a feature that is not easily overlooked by the first user, the alerting setting information is updated so that alerting is not performed. For this reason, by skipping alerting for a feature that is easily visually recognizable to the first user, processing load can be reduced and it is possible to reduce the feeling of troublesomeness that is imparted to the user when alerting is performed for a feature that is not easily overlooked.

A driving assistance device according to a fifth aspect of the present disclosure is the driving assistance device according to any one of the first to third aspects of the disclosure, wherein the processor further causes the driving assistance device to operate as: a storage in which alerting setting information is stored on a per feature type basis, the alerting setting information indicating a setting as to whether alerting is to be performed; a receiver that receives a change in the setting; and an updater that updates the alerting setting information according to the change received by the receiver. Here, the alerter performs the alerting for a third feature of a first type and does not perform the alerting for a fourth feature of a second type, the setting in the alerting setting information corresponding to the first type indicating that the alerting is to be performed, the setting in the alerting setting information corresponding to the second type indicating that the alerting is not to be performed.

Accordingly, since the alerting setting information is updated, for example, so that alerting is not performed depending on the change received, alerting that is necessary and sufficient to the first user can be realized. In other words, by skipping alerting that is unnecessary to the first user, the processing load can be reduced.

A driving assistance device according to a sixth aspect of the present disclosure is the driving assistance device according to any one of the first to fifth aspects of the disclosure, wherein the processor further causes the driving assistance device to operate as: a storage in which visual recognition information is stored, the visual recognition information associating, with each other, a result of determination by the visual recognition determiner and a position that the first vehicle was at when the sight line and the feature were detected, the sight line and the feature being the bases of the result of determination. Here, the obtainer obtains the second position based on visual recognition information of the past stored in the storage.

For this reason, the first user's visual recognition results can be accumulated, and the accumulated results can be used in determining the timing for performing alerting. Therefore, since the newest visual recognition result can be accumulated, the timing for performing the alerting can be determined accurately.

A driving assistance device according to a seventh aspect of the present disclosure is the driving assistance device according to any one of the first to sixth aspects of the disclosure, wherein the processor further causes the driving assistance device to operate as: a speed detector that detects a first speed of the first vehicle. Here, the obtainer further obtains a second speed at which the second vehicle was traveling when the second user visually recognized the feature in the past, and the timing is further determined based on a result of comparison between the first speed and the second speed.

Accordingly, since the timing for performing alerting is determined according to the speed of each vehicle, the timing can be determined accurately.

A driving assistance device according to an eighth aspect of the present disclosure is the driving assistance device according to any one of the first to seventh aspects of the disclosure, wherein the processor further causes the driving assistance device to operate as: an environment detector that detects first environment information indicating a state of an external environment of the first vehicle. Here, the obtainer further obtains second environment information indicating a state of an external environment that the second vehicle was in when the second user visually recognized the feature in the past. Furthermore, the timing is determined based on a result of comparison between the first environment information and the second environment information.

Accordingly, since the timing for performing alerting is determined according to the external environment of each vehicle, the timing can be determined accurately.

A driving assistance device according to a ninth aspect of the present disclosure is the driving assistance device according to any one of the first to eighth aspects of the disclosure, wherein the second user has better driving skills than the first user.

Accordingly, since the timing for performing alerting is determined with reference to the second position that the second vehicle was at when the feature was visually recognized in the past by the second user who has better driving skills than the first user, the timing can be determined more accurately.

A driving assistance method according to a tenth aspect of the present disclosure is a driving assistance method executed by a processor by executing a program stored in a non-transitory memory, and includes: detecting a sight line of a first user who is driving a first vehicle; detecting a feature in a vicinity of the first vehicle; determining whether the first user visually recognized the feature, based on the sight line detected and the feature detected; detecting a first position of the first vehicle; obtaining a second position that a second vehicle was at when a second user driving the second vehicle visually recognized the feature in past; and performing alerting to prompt the first user to visually recognize the feature, when it is determined that the first user has not visually recognized the feature, the alerting being performed at a timing that is determined based on a result of comparison between the first position and the second position.

Accordingly, alerting that prompts the first user to visually recognize the feature is performed at a timing determined based on a result of comparison between a first position that the first vehicle was at when it is determined that the user has not visually recognize the feature and a second position that the second vehicle as at when the second user visually recognized the feature in the past. In other words, since alerting can be performed at a timing in which the first user can visually recognize the feature, based on the position of the first vehicle, the possibility that the first driver will overlook the feature can be reduced.

It should be noted that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be described in detail with reference to the Drawings.

It should be noted that each of the embodiments described shows a general or specific example of the present disclosure. The numerical values, shapes, materials, elements, the arrangement and connection of the elements, steps, the processing order of the steps, etc., indicated in the following embodiments are mere examples, and thus are not intended to limit the claims. Furthermore, among the elements described in the following embodiments, elements not recited in any one of the independent claims that indicate the broadest concepts are described as optional elements. Furthermore, the figures are schematic illustrations and are not necessarily accurate depictions. Therefore, the scales, and so on, in the respective figures are not necessarily uniform. Furthermore, elements which are substantially the same have the same reference signs in the figures.

Embodiment 1

Configuration

FIG. 1 is a block diagram illustrating a configuration of a driving assistance system including a driving assistance device according to Embodiment 1.

Driving assistance system 1 is mounted on a vehicle, and assists driving of the vehicle by a first user (a driver of vehicle 10). Driving assistance system 1 includes driving assistance device 100, storage device 120, sight line detection device 210, object detection device 220, position detection device 230, route setting device 240, display device 310, and audio device 320. The first user is the user who is driving vehicle 10, and is the user whose sight line is to be detected.

First, sight line detection device 210, object detection device 220, position detection device 230, and route setting device 240 will be described.

Sight line detection device 210 detects the sight line of the first user, and outputs sight line information, which is the detection result, to driving assistance device 100. Sight line detection device 210 may detect the sight line of the first user based on, for example, the direction of the eyes of the first user detected from an image obtained from a camera that is arranged in front of a driver's seat and that captures images including the eyes of the first user. Sight line detection device 210 successively detects the sight line of the first user at, for example, a predetermined sampling period, and successively outputs the sight line information. Sight line detection device 210 is realized by, for example, a camera, and a computer that performs a process of detecting the sight line of the first user from an image obtained by the camera.

Object detection device 220 detects an object in the vicinity of the vehicle, and outputs the object detection result to driving assistance device 100. The object in the vicinity of vehicle 10 includes, for example, other vehicles traveling in the vicinity of vehicle 10, pedestrians, obstacles, and the like. Object detection device 220 detects, for example, an object within a predetermined distance from vehicle 10. Object detection device 220 may detect an object by, for example, capturing the vicinity of vehicle 10 by the camera, and recognizing the object in an image using a machine learning model for detecting objects from images obtained by the capturing. Object detection device 220 may be, for example, a device that detects the distance to an object by irradiating laser light of a LiDAR (Light Detection And Ranging) or the like, and measuring the time until the laser light irradiated onto the object is reflected by the object and is returned. Furthermore, object detection device 220 also detects the direction from vehicle 10 to the detected object. That is, object detection device 220 detects the object in the vicinity of vehicle 10, and the direction in which the object is located with respect to vehicle 10. Object detection device 220 successively detects, for example, an object in the vicinity of the vehicle and its direction at a predetermined sampling period, and successively outputs the object detection results. Object detection device 220 may be a combination of a device that recognizes an object from an image of the camera, and a device that detects the object from a detection result of the LiDAR. That is, object detection device 220 is realized by a device including the camera and the computer that performs the process of recognizing an object from an image obtained by the camera, a device including the LiDAR and a computer that performs a process of analyzing the detection result of the LiDAR to detect the object, or a device obtained by combining these devices.

Position detection device 230 detects the position (traveling position) of vehicle 10, and outputs the traveling position information, which is the detection result, to driving assistance device 100. The traveling position information is, for example, position information that indicates the current position of vehicle 10 obtained by receiving a signal of a satellite positioning system, such as a GPS (Global Positioning System), not illustrated. Position detection device 230 may detect the traveling position of vehicle 10 by comparing the detection result of the LiDAR and detection results that are obtained in advance according to the traveling position of vehicle 10, and are stored in a storage device, such as a memory. Position detection device 230 successively detects the position of vehicle 10 at, for example, a predetermined sampling period, and successively outputs the detection results. Position detection device 230 is realized by, for example, a reception device that receives the signal of the satellite positioning system, and a computer that performs a process of calculating the position information from the signal.

Route setting device 240 is a device that sets a planned traveling route from the traveling position of vehicle 10 detected by position detection device 230 to a destination that is set by the first user. Route setting device 240 is realized by, for example, a car navigation system.

Note that the predetermined sampling period that is set to sight line detection device 210, object detection device 220, and position detection device 230 may be mutually the same, or may be mutually different. Sight line detection device 210, object detection device 220, and position detection device 230 may repeatedly perform detection, and the detection timings in these devices need not be mutually synchronized.

Next, the configuration of driving assistance device 100 will be described.

Driving assistance device 100 includes sight line detector 101, feature detector 102, visual recognition determiner 103, position detector 104, generator 105, obtainer 106, and alerter 107.

Sight line detector 101 detects the sight line of the first user who is driving vehicle 10 (a first vehicle), based on the sight line information obtained by sight line detection device 210. Sight line detector 101 obtains the sight line information obtained at, for example, a predetermined sampling period from sight line detection device 210, and successively detects the sight line of the first user at the predetermined sampling period.

Feature detector 102 detects a feature in the vicinity of vehicle 10, based on the object detection result obtained by object detection device 220. Feature detector 102 detects the feature in the vicinity of vehicle 10 by extracting a predefined feature of the obtained object detection result. The feature is a target to be visually recognized by the driver at the time of driving of the vehicle so as to safely drive the vehicle. The feature is a road sign, a road surface label, a traffic signal, a road reflector, and the like. Additionally, the feature may include the direction of a blind spot caused by a building at an intersection of a residential area. Furthermore, feature detector 102 detects the feature, and also detects the direction associated with the feature. That is, feature detector 102 detects the direction in which the feature is located with respect to vehicle 10, together with the feature. Feature detector 102 obtains the object detection result obtained at, for example, a predetermined sampling period from object detection device 220, and successively detects features at the predetermined sampling period.

Figure 2:
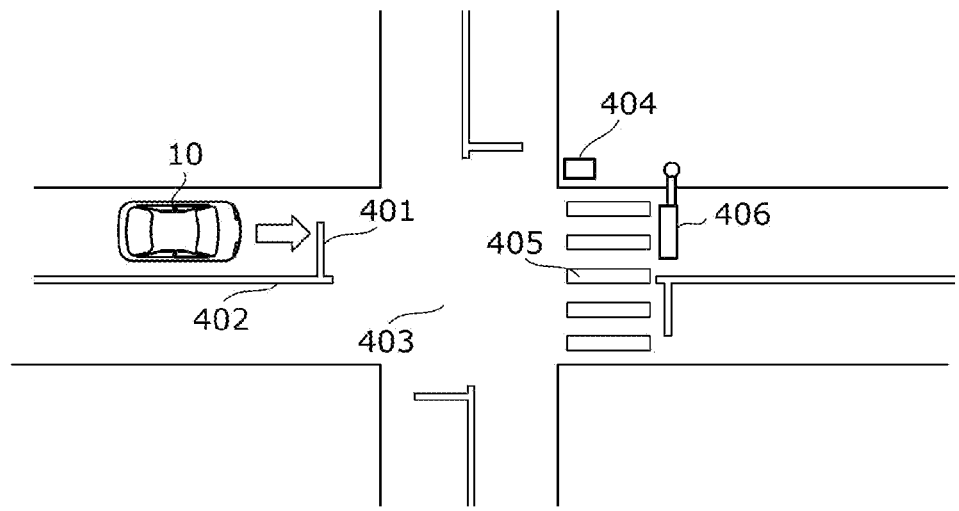
FIG. 2 is a diagram for describing a specific example of a feature.
Figure 3:
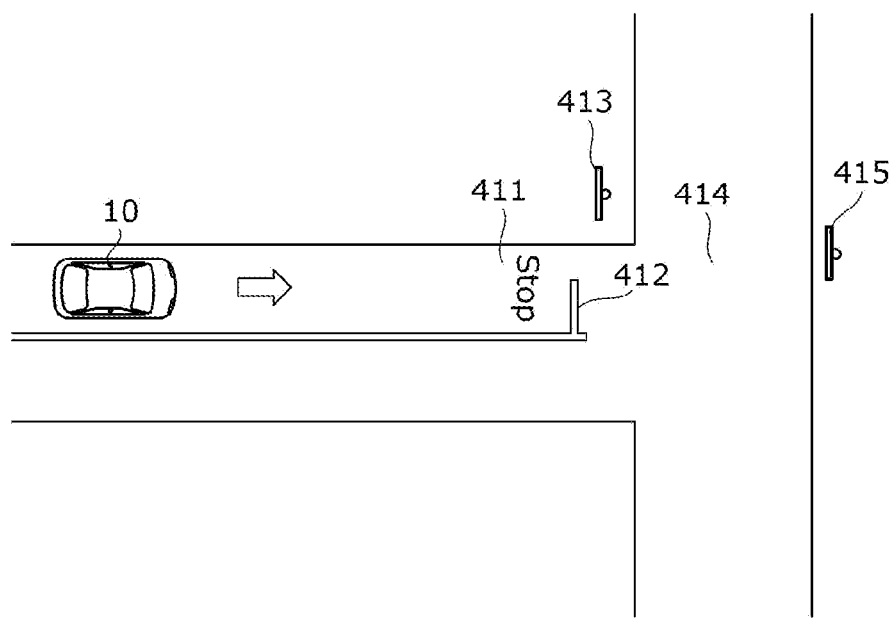
FIG. 3 is a diagram for describing a specific example of a feature.
Figure 4:
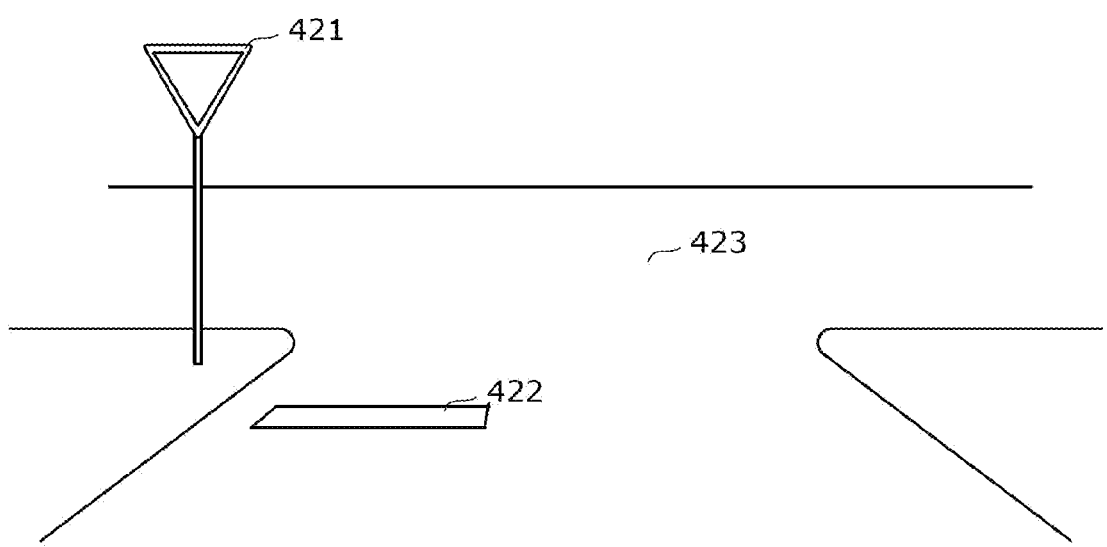
FIG. 4 is a diagram for describing a specific example of a feature.

FIG. 2 to FIG. 4 are diagrams for describing specific examples of a feature.

FIG. 2 illustrates features at intersection 403. As illustrated in FIG. 2, the features include stop line 401, lane 402, intersection 403, pedestrian traffic light 404, pedestrian crossing 405, vehicle traffic signal 406, and the like.

FIG. 3 illustrates features at T-junction 414. As illustrated in FIG. 3, the features include road surface label 411, stop line 412, road sign 413, T-junction 414, road sign 415, and the like.

FIG. 4 illustrates features at T-junction 423. As illustrated in FIG. 4, the features include road sign 421, stop line 422, T-junction 423, and the like.

Based on the sight line detected by sight line detector 101 and features detected by feature detector 102, visual recognition determiner 103 determines whether the first user has visually recognized the features. Specifically, visual recognition determiner 103 compares the direction of a sight line and the direction of a feature, determines that the first user has visually recognized the feature when the difference between the direction of the sight line and the direction of the feature is less than a predetermined error, and determines that the first user has not visually recognized the feature when the above-described difference is the predetermined error or more. The detection results detected at the same timing are used for the sight line and the feature that are used for determination. The detection results detected at the same timing are, for example, detection results that are detected at two times having a time difference smaller than the longer one of the predetermined sampling period for detecting the sight line and the predetermined sampling period for detecting the features. That is, when the difference between the timing at which the sight line is detected and the timing at which the feature is detected is a time difference smaller than the longer one of the predetermined sampling period for detecting the sight line and the predetermined sampling period for detecting the feature, the timings at which the both are detected may be considered to be the same. Visual recognition determiner 103 outputs the determination result to generator 105.

Position detector 104 detects the position (the first position) of vehicle 10 based on the traveling position information obtained by position detection device 230.

Generator 105 generates visual recognition information including the determination result by visual recognition determiner 103, the first position detected at the same timing as the timing at which one of the sight line and the feature used for the determination by visual recognition determiner 103 is detected, and user identification information that identifies the user whose sight line is to be detected. Note that the user identification information may be specified by being input by the user when the user drives vehicle 10, may be specified by performing face recognition of an image including the user's face captured by sight line detection device 210, or may be specified by wireless communication with a terminal or circuit owned by the user. The visual recognition information may further include route information indicating the traveling route along which vehicle 10 is traveling. Generator 105 outputs the visual recognition information to storage device 120.

Obtainer 106 reads, from storage device 120, a plurality of pieces of past visual recognition information stored in storage device 120 for each user, and obtains a second position of vehicle 10 at the time when a feature detected by feature detector 102 was visually recognized by a second user in the past. Here, the second user is a user of vehicle 10 driven by the first user, and is a user different from the first user. Note that the second user may be a user who drives another vehicle. The second user is a user who serves as a reference for determination by alerter 107, which will be described later. The second user may be a user specified by the first user, or may be a user determined according to the level of the driving skill of the first user. The second user is, for example, a user whose driving skill is higher than the driving skill of the first user.

When visual recognition determiner 103 determines that the first user has not visually recognized a feature detected by feature detector 102, alerter 107 performs alerting to prompt the first user to visually recognize the feature, at the timing determined based on the result of comparing the first position that is the current position of vehicle 10, and the second position of vehicle 10 at the time when the feature detected by feature detector 102 was visually recognized by the second user in the past. Specifically, when visual recognition determiner 103 determines that the first user has not visually recognized the feature detected by feature detector 102, alerter 107 performs the alerting at the timing when the first position that is being successively detected by position detector 104 reaches the interval from the second position to the feature. That is, alerter 107 performs the alerting at the timing when it is determined that traveling vehicle 10 has reached the second position (or has passed the second position). In the alerting, display information for displaying, on display device 310, characters or an image including a message that prompts visual recognition of a feature may be output to display device 310. Furthermore, in the alerting, sound information for causing audio device 320 to output a sound message that prompts visual recognition of a feature may be output to audio device 320.

Storage device 120 stores the visual recognition information that is output by generator 105. Storage device 120 may store the display information or the sound information used for the alerting. Storage device 120 is an example of a storage.

Display device 310 is a device controlled by driving assistance device 100 to display an image, and is, for example, a display device such as a liquid crystal display, an organic electroluminescent display, and an HUD (Head Up Display). Display device 310 displays characters or an image including a message, based on the display information that is output from driving assistance device 100.

Audio device 320 is an audio device controlled by driving assistance device 100 to output sound. Audio device 320 may output sound by outputting a sound signal reproduced in driving assistance device 100. Audio device 320 outputs the sound of a message, based on the sound information that is output from driving assistance device 100. Audio device 320 is realized by, for example, an amplifier and a loudspeaker.

Operation

Figure 5:
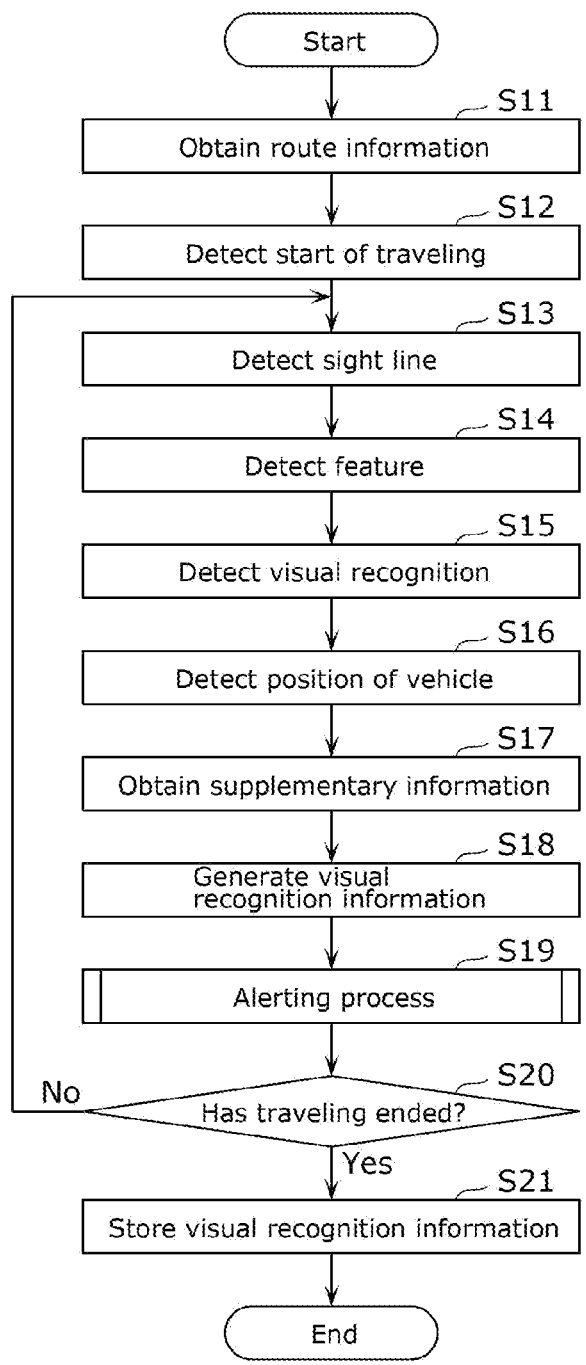
FIG. 5 is a flowchart illustrating an example of process of storing visual recognition information by the driving assistance device.

Next, the operation of driving assistance device 100 will be described. FIG. 5 is a flowchart illustrating an example of a process of storing the visual recognition information by the driving assistance device.

Driving assistance device 100 obtains the route information indicating a planned traveling route that is set by route setting device 240 (S11).

Next, driving assistance device 100 detects the start of traveling by vehicle 10 (S12). Driving assistance device 100 may determine that vehicle 10 has started traveling when, for example, a state where the detected position of vehicle 10 is not changing is transitioned to a state where the detected position of vehicle 10 is changing. Furthermore, by detecting the traveling speed of vehicle 10, it may be determined that vehicle 10 has started traveling when the traveling speed becomes greater than 0.

Next, driving assistance device 100 detects the sight line of the first user who is driving vehicle 10 (the first vehicle), based on the sight line information obtained by sight line detection device 210 (S13).

Next, driving assistance device 100 detects a feature in the vicinity of vehicle 10 based on the object detection result obtained by object detection device 220 (S14).

Note that, for step S13 and step S14, step S13 need not be performed ahead of step S14, and step S14 may be performed ahead of step S13, or may be performed in parallel.

Next, based on the detected sight line and the detected feature, driving assistance device 100 determines whether the first user has visually recognized the feature (S15).

Next, driving assistance device 100 detects the position (the first position) of vehicle 10 based on the traveling position information obtained by position detection device 230 (S16).

Next, driving assistance device 100 obtains supplementary information (S17). The supplementary information is information indicating, for example, the speed of vehicle 10, the state of the external environment of vehicle 10, and the like. The state of the external environment of vehicle 10 includes the date and time, weather, and the like.

Next, driving assistance device 100 generates the visual recognition information including the determination result by visual recognition determiner 103, the first position detected at the same timing as the timing at which one of the sight line and the feature used for the determination by visual recognition determiner 103 was detected, and the user identification information identifying the user whose sight line is to be detected (S18). The visual recognition information may further include the route information indicating a traveling route along which vehicle 10 is traveling, and may further include the supplementary information.

Next, driving assistance device 100 performs an alerting process (S19). The details of the alerting process will be described later by using FIG. 6.

Next, driving assistance device 100 determines whether vehicle 10 has ended traveling (S20). When driving assistance device 100 determines that vehicle 10 has ended traveling (Yes in S20), driving assistance device 100 performs step S21, and when driving assistance device 100 determines that vehicle 10 has not ended traveling (No in S20), driving assistance device 100 returns to step S13. In step S21, driving assistance device 100 causes storage device 120 to store the visual recognition information generated from the start of traveling to the end of traveling (S21).

Figure 6:
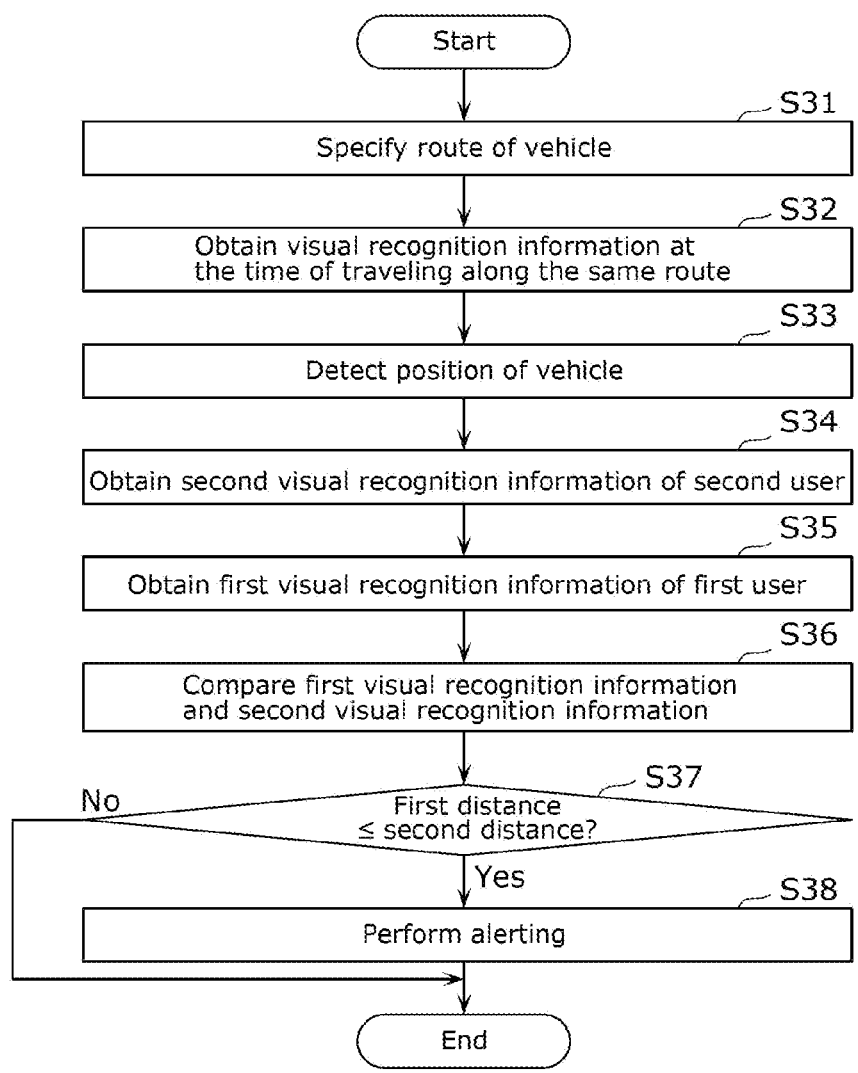
FIG. 6 is a flowchart illustrating an example of an alerting process performed by the driving assistance device.

FIG. 6 is a flowchart illustrating an example of the alerting process (S19) by the driving assistance device.

Driving assistance device 100 specifies the route along which vehicle 10 is traveling (S31). Driving assistance device 100 specifies the route along which vehicle 10 is traveling, based on the change in the time series of the position of vehicle 10 up to the present (the timing at which step S31 is performed). For example, the route being traveled may be represented by information including the current position of vehicle 10 and the traveling direction of vehicle 10.

Next, driving assistance device 100 obtains, from storage device 120, the visual recognition information including the route information indicating the same route as the route of specified vehicle 10 (S32).

Next, driving assistance device 100 detects the position (the first position) of vehicle 10 based on the traveling position information obtained by position detection device 230 (S33).

Next, driving assistance device 100 obtains, from storage device 120, second visual recognition information that is the visual recognition information of the second user (S34).

Next, driving assistance device 100 obtains, from storage device 120, the first visual recognition information that is the visual recognition information of the first user (S35). Note that, in step S35, although the first visual recognition information is obtained from storage device 120, this is not a limitation, and the information generated in step S18 may be obtained.

Next, driving assistance device 100 compares the first visual recognition information and the second visual recognition information (S36).

Next, driving assistance device 100 determines whether a first distance to the detected feature from the first position obtained from the first visual recognition information is less than or equal to a second distance to the feature from the second position obtained from the second visual recognition information (S37). That is, driving assistance device 100 determines whether the first position is closer to the detected feature than the second position, or the first position is the second position. Furthermore, in other words, driving assistance device 100 determines whether it is the timing at which the first position reaches a range from the second position to the feature, inclusive (vehicle 10 reaches the second position). When driving assistance device 100 determines that the first distance is less than or equal to the second distance (Yes in S37), driving assistance device 100 performs step S38, and when driving assistance device 100 determines that the first distance is longer than the second distance (No in S37), driving assistance device 100 ends the alerting process in step S19. Note that, when it is determined to be Yes in step S37, it means that the first user took a longer time than the second user to visually recognize the feature.

In step S38, driving assistance device 100 performs the alerting (S38).

Figure 7:
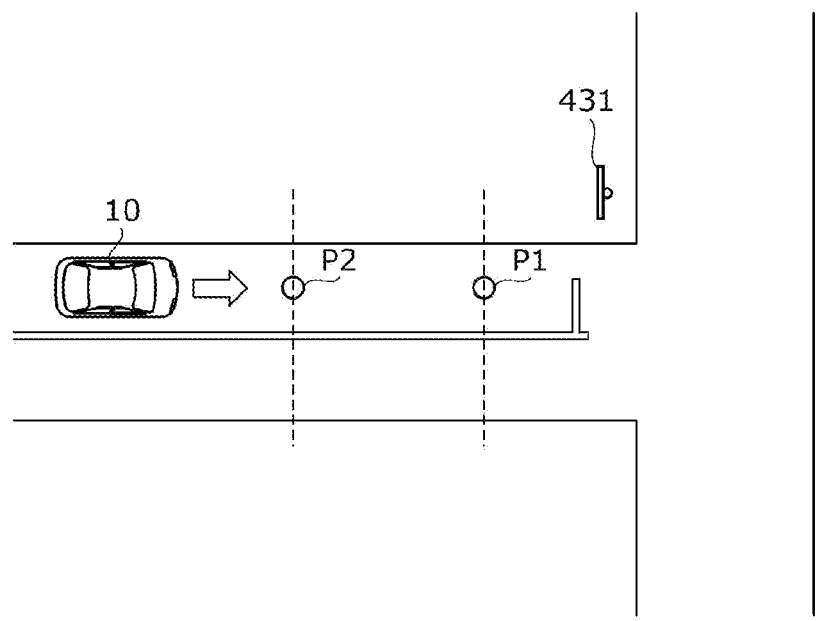
FIG. 7 is a diagram for describing a specific example of an alerting process in Embodiment 1.

FIG. 7 is a diagram for describing a specific example of the alerting process in Embodiment 1. FIG. 7 is a diagram illustrating positions of vehicle 10 at the time when users of vehicle 10 visually recognize road sign 431 as a feature during traveling of vehicle 10.

Position P1 is a position of the vehicle at the time when the first user visually recognized road sign 431, when the first user drives vehicle 10. Position P2 is a position of vehicle 10 (or another vehicle) at the time when the second user visually recognized road sign 431, when the second user drove vehicle 10 (or another vehicle).

In this case, since the first user does not visually recognize road sign 431 even when vehicle 10 driven by the first user reaches position P2, the alerting is performed at the timing at which vehicle 10 reaches position P2.

Advantageous Effects, Etc.

Driving assistance device 100 according to the present embodiment includes sight line detector 101, feature detector 102, visual recognition determiner 103, position detector 104, obtainer 106, and alerter 107. Sight line detector 101 detects a sight line of a first user who is driving vehicle 10. Feature detector 102 detects a feature in the vicinity of vehicle 10. Visual recognition determiner 103 determines whether the first user visually recognized the feature, based on the sight line detected and the feature detected. Position detector 104 detects a first position of vehicle 10. Obtainer 106 obtains a second position that a second vehicle was at when a second user driving the second vehicle visually recognized the feature in the past. Alerter 107 performs alerting to prompt the first user to visually recognize the feature, when the visual recognition determiner determines that the first user has not visually recognized the feature. Here, the alerting is performed at a timing that is determined based on a result of comparison between the first position and the second position.

Accordingly, alerting that prompts the first user to visually recognize the feature is performed at a timing that is determined based on a result of comparison between a first position that vehicle 10 is at when it is determined that the user has not visually recognized the feature and a second position that a second vehicle was at when a second user driving the second vehicle visually recognized the feature in the past. In other words, since alerting can be performed at a timing in which the first user can visually recognize the feature, based on the position of vehicle 10, the possibility that the first driver will overlook the feature can be reduced.

Furthermore, in driving assistance device 100 according to the present embodiment, when visual recognition determiner 103 determines that the first user has not recognized the feature detected, alerter 107 performs the alerting at a timing in which the first position detected is at the same position as the second position.

Accordingly, since alerting of the first user is performed at least at the timing at which the second user visually recognized the feature in the past, the possibility that the first driver will overlook the feature can be reduced.

Furthermore, driving assistance device 100 according to the present embodiment further includes storage device 120 in which visual recognition information is stored, the visual recognition information associating, with each other, a result of determination by visual recognition determiner 103 and a position that vehicle 10 was at when the sight line and the feature were detected, the sight line and the feature being the bases of the result of determination. Obtainer 106 obtains the second position based on visual recognition information of the past stored in storage device 120.

For this reason, the first user's visual recognition results can be accumulated, and the accumulated results can be used in determining the timing for performing alerting. Therefore, since the newest visual recognition result can be accumulated, the timing for performing the alerting can be determined accurately.

Furthermore, in driving assistance device 100 according to the present embodiment, the second user has better driving skills than the first user. Accordingly, since the timing for performing alerting is determined with reference to the second position that the second vehicle was at when the feature was visually recognized in the past by the second user who has better driving skills than the first user, the timing can be determined more accurately.

Variation of Embodiment 1

(1)

Driving assistance device 100 according to the above-described embodiment may detect the speed of vehicle 10, and store the speed detected in storage device 120 by including the speed detected in visual recognition information. In this case, alerter 107 of driving assistance device 100 may adjust the timing at which to perform alerting, taking the speed into consideration. Specifically, alerter 107 may compare the detected first speed of vehicle 10 and a second speed that vehicle 10 (or another vehicle) was traveling when the second user visually recognized the feature in the past, and determine the timing at which to perform the alerting based on the result of the comparison between the first speed and the second speed.

Specifically, when the first speed is faster than the second speed, the alerting may be performed at a timing at which vehicle 10 passes a position before vehicle 10 reaches the second position (that is, a position at which the distance from a target feature is farther from the target feature than the second position is). On the contrary, when the first speed is slower than the second speed, the alerting may be performed at a timing at which the vehicle passes a position after the vehicle passes the second position (that is, a position at which the distance from the target feature is closer to the target feature than the second position is). Accordingly, the timing at which to perform the alerting is determined according to the speed of each vehicle, the timing can be accurately determined.

(2)

Driving assistance device 100 according to the above-described embodiment may detect first environment information indicating the state of the external environment of vehicle 10, and store the first environment information detected in storage device 120 by including the first environment detected in visual recognition information. In this case, alerter 107 of driving assistance device 100 may adjust the timing at which to perform alerting, taking the speed into consideration. Specifically, alerter 107 may determine the timing at which to perform the alerting based on the result of a comparison between the first environment information and second environment information indicating the state of the external environment that vehicle 10 (or another vehicle) was in when the second user visually recognized the feature in the past.

Specifically, by narrowing down the second visual recognition information to be obtained from storage device 120 to the second visual recognition information including the second environment information in the same state as the first environment information, the timing at which to perform the alerting can be determined based on the second visual recognition information with the same conditions of the external environment of vehicle 10. Accordingly, since the timing at which to perform the alerting is determined according to the external environment of each vehicle, the timing can be accurately determined.

Embodiment 2

Configuration

Figure 8:
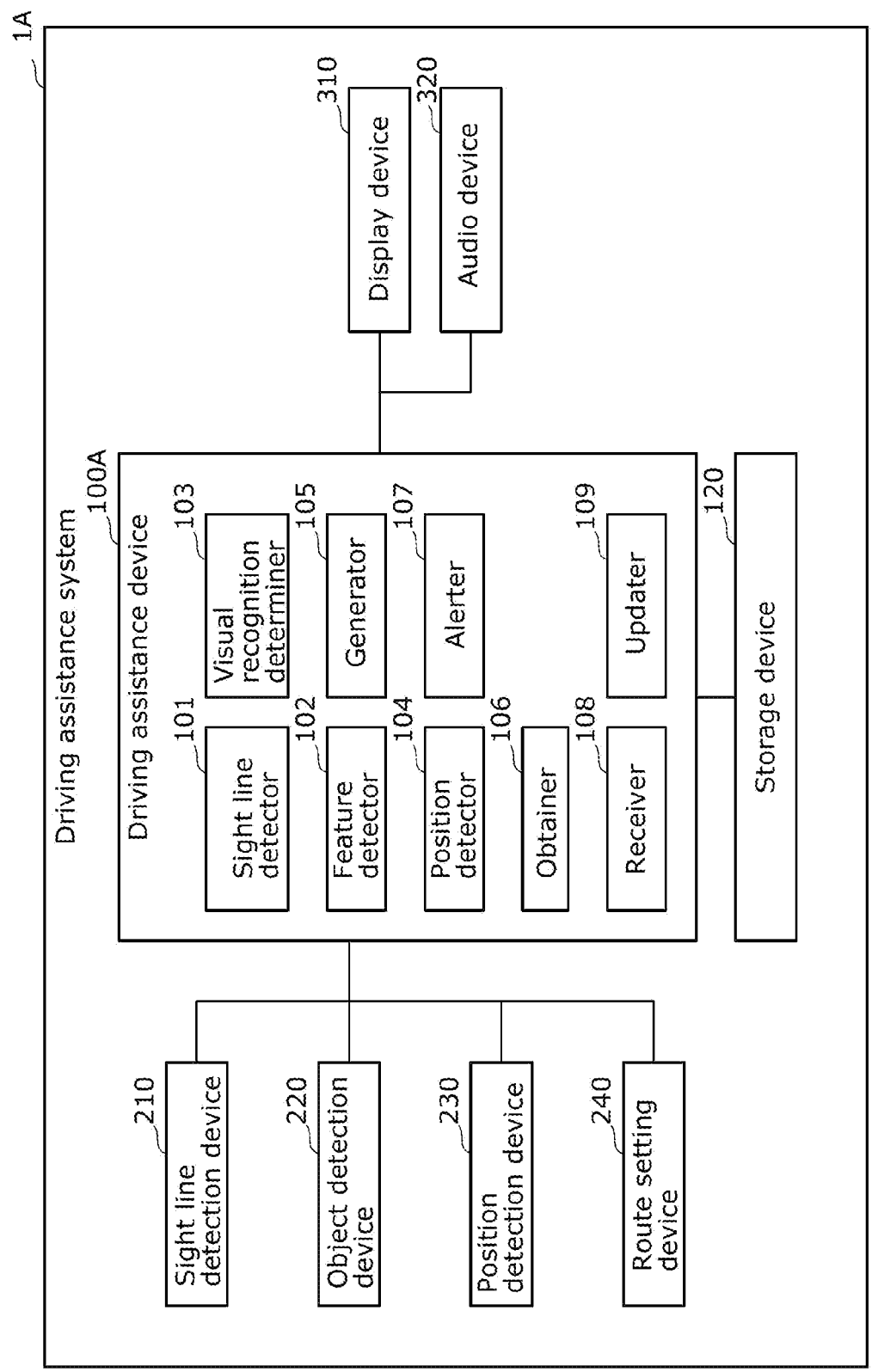
FIG. 8 is a block diagram illustrating a configuration of a driving assistance system including a driving assistance device according to Embodiment 2.

FIG. 8 is a block diagram illustrating a configuration of a driving assistance system including a driving assistance device according to Embodiment 2.

Driving assistance system 1A according to Embodiment 2 is different in the configuration of driving assistance device 100A as compared with driving assistance system 1 according to Embodiment 1. Therefore, the different configuration of driving assistance device 100A will be mainly described.

Compared with driving assistance device 100 in Embodiment 1, driving assistance device 100A is different in that receiver 108 and updater 109 are further included. The processes performed by obtainer 106 and alerter 107 are different. Furthermore, the information stored in storage device 120 is different.

Storage device 120 stores, on a per feature basis, alerting setting information indicating a setting as to whether the alerting is to be performed. The alerting setting information may be defined on a per feature type basis.

Obtainer 106 further obtains a third position of vehicle 10 at the time when a feature was visually recognized by the first user in the past.

When visual recognition determiner 103 determines that the first user has not visually recognizing a feature, and the third position is located closer to the feature than the second position, alerter 107 performs the alerting at a timing when the first position reaches a range from a fourth position to the feature, inclusive, the fourth position being farther from the feature than the second position is. That is, in this case, alerter 107 performs the alerting at a timing when it is determined that traveling vehicle 10 has reached the fourth position (or has passed the fourth position).

Figure 9:
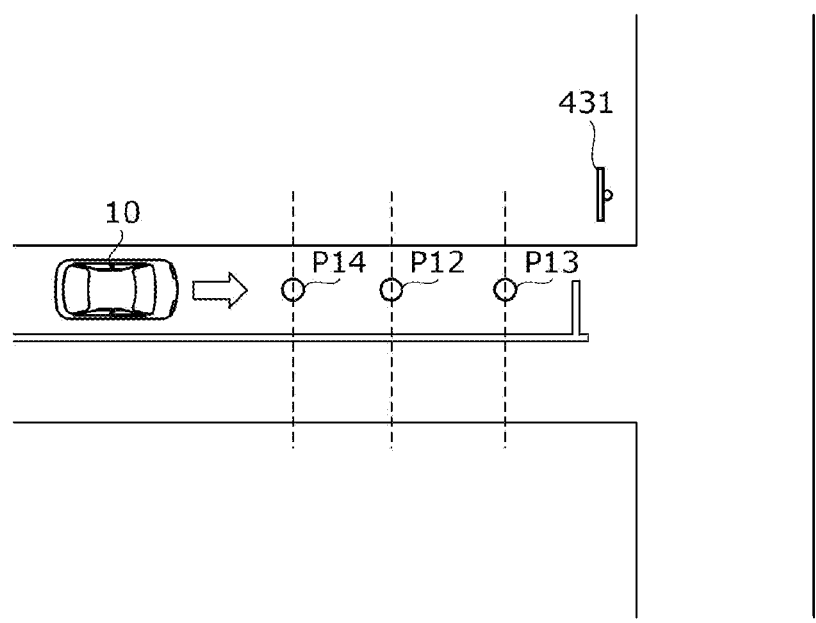
FIG. 9 is a diagram for describing a specific example of an alerting process in Embodiment 2.

FIG. 9 is a diagram for describing a specific example of the alerting process in Embodiment 2. FIG. 9 is a diagram illustrating positions of vehicle 10 at the time when user of vehicle 10 has visually recognized road sign 431 as a feature during traveling of vehicle 10.

Position P12 is a position of vehicle 10 (or another vehicle) at the time when the second user visually recognized road sign 431 when the second user drove vehicle 10 (or another vehicle) in the past. Position P13 is a position of vehicle 10 at the time when the first user visually recognized road sign 431, when the first user drove vehicle 10 in the past. Position P14 is a position that indicates a timing at which the alerting is to be performed when vehicle 10 driven by the first user passes by, and that is set farther from road sign 431 than position P12. That is, when the first user visually recognized road sign 431 at a timing later than the second user in the past, alerter 107 performs the alerting at the timing when vehicle 10 is located at fourth position P14 before second position P12, while the first user is next driving vehicle 10 along the same route.

Receiver 108 receives an input indicating a change in the setting from the first user.

Updater 109 updates the alerting setting information of a feature that was visually recognized by the first user in the past at the third position located farther from the feature than the second position to the setting indicating that the alerting is not to be performed. That is, when the timing at which the first user visually recognized a specific feature in the past is faster than the timing at which the second user visually recognized the specific feature in the past, the alerting setting information may be set such that the alerting is not to be performed for the specific feature. Furthermore, updater 109 may update the alerting setting information according to the change received by receiver 108.

Alerter 107 may perform the alerting for a first feature for which is alerting is set to be performed in the alerting setting information stored in storage device 120, and need not perform the alerting for a second feature for which alerting is set not to be performed.

Operation

Figure 10:
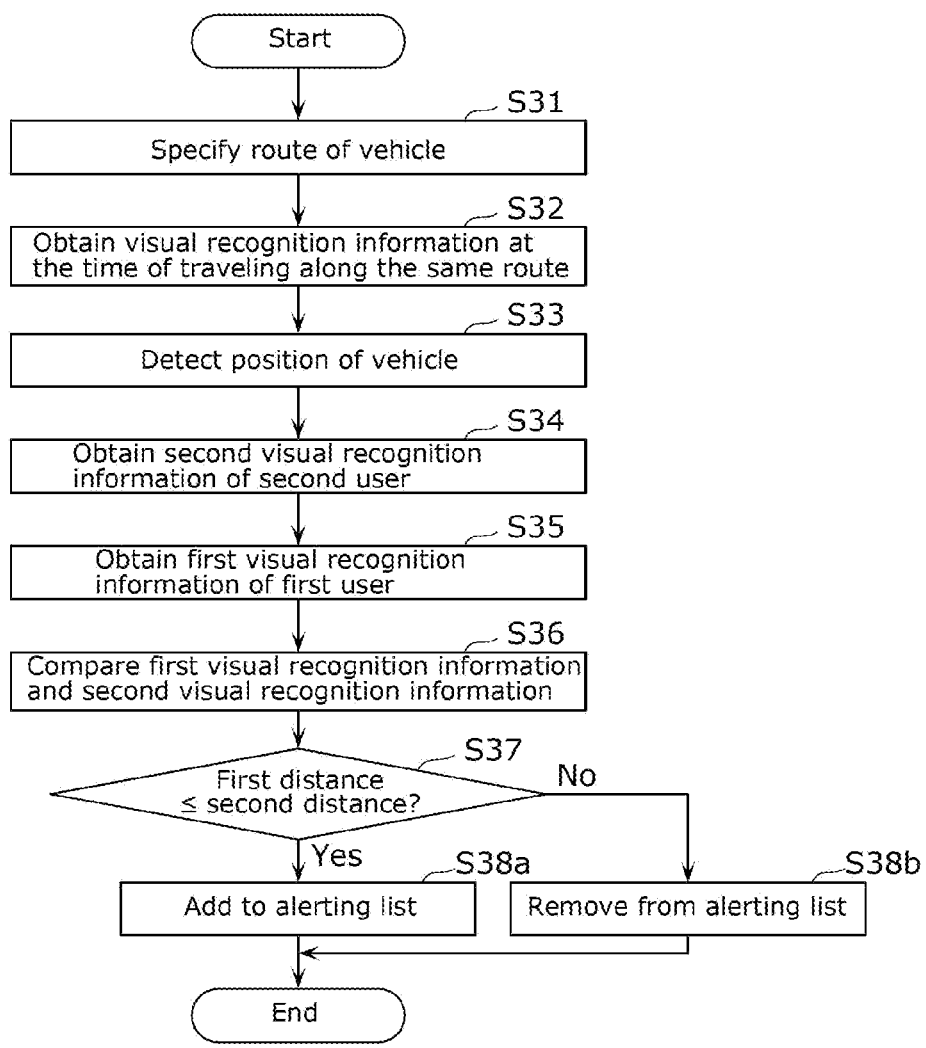
FIG. 10 is a flowchart illustrating an example of an alerting setting process in Embodiment 2.

FIG. 10 is a flowchart illustrating an example of an alerting setting process in Embodiment 2.

Since the alerting setting process is the same as the alerting process in Embodiment 1 in step S31 to step S37, different processes will be mainly described.

When driving assistance device 100A determines that the first distance is less than or equal to the second distance (Yes in S37), driving assistance device 100A performs step S38a, and when driving assistance device 100A determines that the first distance is longer than the second distance (No in S37), driving assistance device 100A performs step S38b.

In step S38a, in order to perform updating to the setting indicating that the alerting is to be performed for the feature that has become a processing target of the alerting process, driving assistance device 100A adds the feature to an alerting list, (S38a). The alerting list is information indicating the alerting setting information that is set for each of a plurality of features.

In step S38b, in order to perform updating to the setting indicating that the alerting is not to be performed for a feature that has become the processing target of the alerting process, driving assistance device 100A removes the feature from the alerting list (S38a).

FIG. 11 is a flowchart illustrating an example of the alerting process in Embodiment 2.

Driving assistance device 100A obtains an alerting target list from storage device 120 (S41).

Next, driving assistance device 100 detects the position (the first position) of vehicle 10 based on the traveling position information obtained by position detection device 230 (S42).

Next, driving assistance device 100 obtains, from storage device 120, the second visual recognition information that is the visual recognition information of the second user (S43).

Next, driving assistance device 100A generates, as the fourth position, the position obtained by adding a margin to the second position obtained based on the second visual recognition information (S44).

Next, driving assistance device 100 obtains, from storage device 120, the first visual recognition information that is the visual recognition information of the first user (S45). Note that, in step S45, although the first visual recognition information is obtained from storage device 120, this is not a limitation, and the information generated in step S18 may be obtained.

Next, driving assistance device 100 compares the first position and the fourth position (S46).

Next, driving assistance device 100 determines whether the first distance from the first position to the detected feature is less than or equal to the fourth distance from the fourth position to the feature (S47). That is, driving assistance device 100 determines whether the first position is closer to the detected feature than the fourth position is, or the first position is the fourth position. Furthermore, in other words, driving assistance device 100 determines whether it is the timing (vehicle 10 arrived at the 4th position) at which the first position reaches a range from the fourth position to the feature, inclusive. When the first distance is less than or equal to the fourth distance (Yes in S47), driving assistance device 100 performs step S48, and when the first distance is not less than or equal to the fourth distance (No in S47), driving assistance device 100 ends the alerting process of step in S19.

In step S48, driving assistance device 100 performs the alerting (S48).

Advantageous Effects, Etc.

In driving assistance device 100A according to the present embodiment, obtainer 106 further obtains a third position that the first vehicle was at when the first user visually recognized the feature in the past. When visual recognition determiner 103 determines that the first user has not visually recognized the feature and the third position is located closer to the feature than the second position is, alerter 107 performs the alerting at a timing when the first position reaches a fourth position that is farther from the feature than the second position is.

Accordingly, since alerting of the first user is performed at least at a timing that is earlier than the timing at which the second user visually recognized the feature in the past, the possibility that the first driver will overlook the feature can be reduced.

Furthermore, driving assistance device 100A according to the present embodiment further includes storage device 120 and updater 109. Storage device 120 stores, on a per feature basis, alerting setting information indicating a setting as to whether alerting is to be performed. Updater 109 updates the alerting setting information of a feature that was visually recognized by the first user in the past at the third position located farther from the feature than the second position is, to a setting indicating that the alerting is not to be performed. Alerter 107 performs the alerting for a first feature and does not perform the alerting for the second feature. Here, the setting in the alerting setting information corresponding to the first feature indicates that the alerting is to be performed, and the setting in the alerting setting information corresponding to the second feature indicates that the alerting is not to be performed.

Accordingly, since a feature that the first user visually recognized in the past at an earlier timing than the second user did can be determined as a feature that is not easily overlooked by the first user, the alerting setting information is updated so that alerting is not performed. For this reason, by skipping alerting for a feature that is easily visually recognizable to the first user, processing load can be reduced and it is possible to reduce the feeling of troublesomeness that is imparted to the user when alerting is performed for a feature that is not easily overlooked.

Furthermore, driving assistance device 100A according to the present embodiment further includes storage device 120, receiver 108, and updater 109. Storage device 120 stores, on a per feature type basis, alerting setting information indicating a setting as to whether alerting is to be performed. Receiver receives a change in the setting. Updater 109 updates the alerting setting information according to the change received by receiver 108. Alerter 107 performs the alerting for a third feature of a first type and does not perform the alerting for a fourth feature of a second type. Here, the setting in the alerting setting information corresponding to the first type indicates that the alerting is to be performed, and the setting in the alerting setting information corresponding to the second type indicates that the alerting is not to be performed.

Accordingly, since the alerting setting information is updated, for example, so that alerting is not performed depending on the change received, alerting that is necessary and sufficient to the first user can be realized. In other words, by skipping alerting that is unnecessary to the first user, the processing load can be reduced.

Other Embodiments

In the above-described embodiments, although storage device 120 included in driving assistance system 1, 1A stores the visual recognition information, this is not a limitation, and an external storage device connected to driving assistance system 1, 1A may obtain and store the visual recognition information from driving assistance system 1, 1A. In this case, driving assistance device 100, 100A may obtain, from the external storage device, the visual recognition information for determining the timing at which the alerting is to be performed. The external storage device is a device that is communicatively connected to driving assistance system 1, 1A via a network (a storage device on the network), and that is provided outside of vehicle 10. The external storage device is, for example, a cloud server.

Although a driving assistance device according to one or more aspects has been described up to this point based on the foregoing exemplary embodiments, the present disclosure is not limited to the foregoing embodiments. Forms obtained by making various modifications to the forgoing embodiments that can be conceived by those skilled in the art, so long as they do not depart from the essence of the present disclosure, may be included in the scope of the present disclosure.

Furthermore, for example, each of the elements of the respective devices included in driving assistance system 1 and 1A are configured using dedicated hardware, but may be implemented by executing a software program suitable for the element. Each of the elements may be implemented by means of a program executer, such as a CPU or a processor, reading and executing the software program recorded on a non-transitory recording medium such as a hard disk or a semiconductor memory.

It should be noted that the present disclosure also includes the cased indicated below.

(1) At least one of the above-described devices may be a computer system configured with, specifically, a microprocessor, a Read Only Memory (ROM), a Random Access Memory (RAM), a hard disk unit, a display unit, a keyboard, a mouse, and so on. The RAM or the hard disk unit stores a computer program. The microprocessor operates according to the computer program, so that the function of the device is achieved. Here, the computer program includes a combination of a plurality of instruction codes indicating instructions to be given to the computer so as to achieve a specific function.

(2) Some or all of the elements included in at least one of the devices described above may be realized as a single system large scale integration (LSI). The system LSI is a super multifunctional LSI manufactured by integrating a plurality of structural components onto a single chip. To be more specific, the system LSI is a computer system configured with a microprocessor, a ROM, and a RAM, for example. The RAM stores a computer program. The microprocessor operates according to the computer program, so that a function of the system LSI is achieved.

(3) Some or all of the elements included in at least one of the devices described above may be implemented as an IC card or a standalone module that can be inserted into and removed from the corresponding device. The IC card or the module is a computer system configured with a microprocessor, a ROM, and a RAM, for example. The IC card or the module may include the aforementioned super multifunctional LSI. The microprocessor operates according to the computer program, so that a function of the IC card or the module is achieved. The IC card or the module may be tamper-resistant.

(4) The present disclosure may be the methods described above. The present disclosure may be a computer program for causing a computer to execute these methods. Moreover, the present disclosure may be a digital signal of the computer program.

Moreover, the present disclosure may be the aforementioned computer program or digital signal recorded on a non-transitory, computer-readable recording medium, such as a flexible disk, a hard disk, a Compact Disc (CD)-ROM, a DVD, a DVD-ROM, a DVD-RAM, a Blu-ray (registered trademark) Disc (BD), or a semiconductor memory. The present disclosure may also be the digital signal recorded on such a recording medium.

Furthermore, the present disclosure may be the aforementioned computer program or digital signal transmitted via a telecommunication line, a wireless or wired communication line, a network represented by the Internet, and data broadcasting.

Furthermore, by transferring the recording medium having the aforementioned program or digital signal recorded thereon or by transferring the aforementioned program or digital signal via the aforementioned network or the like, the present disclosure may be implemented by a different independent computer system.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosure of the following patent application including specification, drawings, and claims is incorporated herein by reference in its entirety: Japanese Patent Application No. 2023-010326 filed on Jan. 26, 2023.

INDUSTRIAL APPLICABILITY

The present disclosure is useful as a driving assistance device, or the like, that is capable of performing alerting at an appropriate timing.

The invention claimed is:
1. A driving assistance device, comprising:
a processor; and
a non-transitory memory in which a program is stored, wherein
the processor executes the program to cause the driving assistance device to operate as:
a sight line detector that detects a sight line of a first user who is driving a first vehicle;

a feature detector that detects a feature in a vicinity of the first vehicle;

a visual recognition determiner that determines whether the first user visually recognized the feature, based on the sight line detected and the feature detected;

a position detector that detects a first position of the first vehicle;

an obtainer that obtains a second position that a second vehicle was at when a second user driving the second vehicle visually recognized the feature in past; and an alerter that performs alerting to prompt the first user to visually recognize the feature, based on whether the visual recognition determiner determines that the first user has visually recognized the feature, the alerting being performed at a timing that is determined based on a result of a comparison between the first position and the second position.

2. The driving assistance device according to claim 1, wherein when the visual recognition determiner determines that the first user has not visually recognized the feature, the alerter performs the alerting at the timing when the first position detected reaches a range from the second position to the feature, inclusive.

3. The driving assistance device according to claim 1, wherein the obtainer further obtains a third position that the first vehicle was at when the first user visually recognized the feature in the past, and when the visual recognition determiner determines that the first user has not visually recognized the feature and the third position is located closer to the feature than the second position, the alerter performs the alerting at a second timing when the first position reaches a range from a fourth position to the feature, inclusive, the fourth position being farther from the feature than the second position.

4. The driving assistance device according to claim 3, wherein the processor further causes the driving assistance device to operate as:

a storage in which alerting setting information is stored on a per feature basis, the alerting setting information indicating a setting as to whether the alerting is to be performed; and an updater that updates the alerting setting information of the feature that was visually recognized in the past by the first user at the third position located farther from the feature than the second position, to the setting indicating that the alerting is not to be performed, and the alerter performs the alerting for a second feature and does not perform the alerting for the feature, the setting in the alerting setting information corresponding to the first second feature indicating that the alerting is to be performed, the setting in the alerting setting information corresponding to the feature indicating that the alerting is not to be performed.

5. The driving assistance device according to claim 1, wherein the processor further causes the driving assistance device to operate as:

a storage in which alerting setting information is stored on a per feature type basis, the alerting setting information indicating a setting as to whether the alerting is to be performed;

a receiver that receives a change in the setting; and an updater that updates the alerting setting information according to the change received by the receiver, and the alerter performs the alerting for a third feature of a first type and does not perform the alerting for a fourth feature of a second type, the setting in the alerting setting information corresponding to the first type indicating that the alerting is to be performed, the setting in the alerting setting information corresponding to the second type indicating that the alerting is not to be performed.

6. The driving assistance device according to claim 1, wherein the processor further causes the driving assistance device to operate as:

a storage in which visual recognition information is stored, the visual recognition information associating a result of a determination by the visual recognition determiner and a position of the first vehicle when the sight line and the feature were detected, the sight line and the feature being bases of the result of determination, and the obtainer obtains the second position based on the visual recognition information stored in the storage.

7. The driving assistance device according to claim 1, wherein the processor further causes the driving assistance device to operate as:

a speed detector that detects a first speed of the first vehicle, the obtainer further obtains a second speed at which the second vehicle was traveling when the second user visually recognized the feature in the past, and the timing is further determined based on a second result of a second comparison between the first speed and the second speed.

8. The driving assistance device according to claim 1, wherein the processor further causes the driving assistance device to operate as:

an environment detector that detects first environment information indicating a first state of a first external environment of the first vehicle, the obtainer further obtains second environment information indicating a second state of a second external environment that the second vehicle was in when the second user visually recognized the feature in the past, and the timing is further determined based on a second result of a second comparison between the first environment information and the second environment information.

9. The driving assistance device according to claim 1, wherein the second user has better driving skills than the first user.

10. A driving assistance method executed by a processor, by the processor executing a program stored in a non-transitory memory, the driving assistance method comprising:

detecting a sight line of a first user who is driving a first vehicle;

detecting a feature in a vicinity of the first vehicle;

determining whether the first user visually recognized the feature, based on the sight line detected and the feature detected;

detecting a first position of the first vehicle;

obtaining a second position that a second vehicle was at when a second user driving the second vehicle visually recognized the feature in past; and performing alerting to prompt the first user to visually recognize the feature, based on whether the processor determines that the first user has visually recognized the feature, the alerting being performed at a timing that is determined based on a result of a comparison between the first position and the second position.

11. A driving assistance device, comprising:

a processor; and a memory including a program that, when executed by the processor, causes the processor to perform functions, the functions including:

detecting a sight line of a first user that is driving a first vehicle;

detecting a feature in a vicinity of the first vehicle;

determining whether the first user visually recognizes the feature, based on the sight line and the feature;

detecting a first position of the first vehicle when the processor determines whether the first user visually recognizes the feature;

obtaining a second position of a second vehicle, the second position being when a second user that is driving the second vehicle visually recognizes the feature; and prompting the first user to visually recognize the feature, based on whether the processor determines that the first user visually recognizes the feature, at a timing that is based on a result of a comparison between the first position and the second position.

* * * * *